(12) United States Patent
Lambertson

(10) Patent No.: US 11,181,281 B2
(45) Date of Patent: *Nov. 23, 2021

(54) MULTI-STAGE HOOD FILTER SYSTEM

(71) Applicant: Streivor, Inc., Livermore, CA (US)

(72) Inventor: Jeffrey S. Lambertson, Danville, CA (US)

(73) Assignee: Strevior, Inc., Livermore, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/657,763

(22) Filed: Oct. 18, 2019

(65) Prior Publication Data

US 2020/0047102 A1 Feb. 13, 2020

Related U.S. Application Data

(63) Continuation of application No. 15/640,003, filed on Jun. 30, 2017, which is a continuation-in-part of
(Continued)

(51) Int. Cl.
*B01D 46/52* (2006.01)
*F24C 15/20* (2006.01)
(Continued)

(52) U.S. Cl.
CPC ...... *F24C 15/2035* (2013.01); *B01D 46/0006* (2013.01); *B01D 46/0023* (2013.01);
(Continued)

(58) Field of Classification Search
CPC ............ B01D 15/2035; B01D 46/0006; B01D 46/0023; B01D 46/52; B01D 50/002; B01D 2267/60; B01D 2279/35
(Continued)

(56) References Cited

U.S. PATENT DOCUMENTS 1,542,529 A 6/1925 Runback
2,062,649 A 12/1936 Hegan
(Continued)

FOREIGN PATENT DOCUMENTS

WO 2015179670 11/2015
WO 2015179670 2/2016
WO 2015179670 3/2016

OTHER PUBLICATIONS

"Canopy Filters Stainless Steel Baffle Filter 445HX445VVX48MM", Availablle Online at: http://www.kannilcatering.co.uk/product/canopy-filters-stainless-steel-baffle-filter-445hx445wx48nnnn/, Accessed on internet at: Sep. 8, 2020, 2 pages.
(Continued)

*Primary Examiner* — Minh Chau T Pham
(74) *Attorney, Agent, or Firm* — Kilpatrick Townsend & Stockton LLP

(57) ABSTRACT

A filtration system for a ventilation hood includes a first filter and a second filter, operatively disposed in series. The first filter is configured to be mounted within the ventilation hood, and has an air inlet, an air outlet, and a grease outlet. The second filter includes a filter material with an upstream surface and a downstream surface, an upstream housing element abutting the upstream surface of the filter material, and a downstream housing element abutting the downstream surface of the filter material. The housing elements include openings, and hold the filter material in compression.

20 Claims, 12 Drawing Sheets

Related U.S. Application Data application No. 14/284,350, filed on May 21, 2014, now Pat. No. 9,732,966, which is a continuation-in-part of application No. 13/363,128, filed on Jan. 31, 2012.

(60) Provisional application No. 61/438,226, filed on Jan. 31, 2011.

(51) Int. Cl.
  *B01D 50/00*  (2006.01)
  *B01D 46/00*  (2006.01)

(52) U.S. Cl.
  CPC .......... *B01D 46/52* (2013.01); *B01D 50/002* (2013.01); *B01D 2267/60* (2013.01); *B01D 2279/35* (2013.01)

(58) Field of Classification Search
  USPC .......... 55/467, 492, 486, 514, 528; 95/265; 96/108; 126/299 R
  See application file for complete search history.

(56) References Cited

U.S. PATENT DOCUMENTS

| | | | |
|---|---|---|---|
| 2,071,806 A | 2/1937 | Walker | |
| 2,230,765 A | 2/1941 | Shimer | |
| 79,839 A | 3/1957 | Dreyfuss | |
| 2,812,038 A | 11/1957 | Krueger | |
| 2,862,437 A | 12/1958 | Smith et al. | |
| D195,108 S | 4/1963 | Sundberg et al. | |
| 3,164,456 A | 1/1965 | Brainerd, Jr. et al. | |
| D200,516 S | 3/1965 | Miller | |
| 3,177,637 A | 4/1965 | Davis | |
| 3,357,763 A | 12/1967 | Toper et al. | |
| 3,500,740 A | 3/1970 | Aubrey | |
| 3,618,659 A | 11/1971 | Rawal | |
| 3,620,375 A | 11/1971 | Atkins | |
| D234,692 S | 4/1975 | Laakkonen et al. | |
| D236,471 S | 8/1975 | Steven | |
| 3,910,782 A | 10/1975 | Struble et al. | |
| D244,691 S | 6/1977 | Morrison et al. | |
| 4,089,327 A | 5/1978 | Welsh et al. | |
| 4,186,727 A | 2/1980 | Kaufman et al. | |
| 4,200,087 A | 4/1980 | Welsh | |
| 4,350,504 A | 9/1982 | Diachuk | |
| D270,275 S | 8/1983 | Morrow et al. | |
| 4,610,705 A | 9/1986 | Sarnosky et al. | |
| D300,457 S | 3/1989 | Miyake et al. | |
| 4,902,316 A | 2/1990 | Giles et al. | |
| 4,955,995 A * | 9/1990 | Pontius | B01D 39/00 55/467 |
| 5,015,377 A | 5/1991 | Silvera | |
| 5,141,540 A | 8/1992 | Helmus | |
| D334,053 S | 3/1993 | Cook | |
| 5,449,469 A | 9/1995 | Burklund et al. | |
| 5,743,927 A | 4/1998 | Osendorf | |
| D414,854 S | 10/1999 | Omaki et al. | |
| 5,989,303 A | 11/1999 | Hodge | |
| 6,110,245 A | 8/2000 | Schlag et al. | |
| 6,149,701 A | 11/2000 | Ellingson | |
| 6,293,983 B1 * | 9/2001 | More | B01D 39/1615 55/486 |
| 6,394,083 B1 | 5/2002 | Lambertson | |
| 6,712,869 B2 | 3/2004 | Cheng et al. | |
| 6,764,533 B2 * | 7/2004 | Lobiondo, Jr. | B03C 3/155 55/493 |
| 6,797,041 B2 | 9/2004 | Brownell et al. | |
| 6,814,660 B1 | 11/2004 | Cavett | |
| 6,833,022 B2 | 12/2004 | Feisthammel et al. | |
| 7,041,159 B2 | 5/2006 | Entezarian et al. | |
| D538,418 S | 3/2007 | Pippel et al. | |
| D544,949 S | 6/2007 | Winters et al. | |
| 7,316,720 B2 | 1/2008 | Cuppari et al. | |
| D581,510 S | 11/2008 | Albano et al. | |
| D583,042 S | 12/2008 | Jackson et al. | |
| 7,581,539 B2 | 9/2009 | Aviles | |
| D614,276 S | 4/2010 | Harris et al. | |
| 7,785,382 B2 | 8/2010 | Morton | |
| 8,021,455 B2 | 9/2011 | Adamek et al. | |
| 8,062,403 B2 | 11/2011 | Goode | |
| D657,858 S | 4/2012 | Platt | |
| D657,859 S | 4/2012 | Platt | |
| 8,182,588 B2 | 5/2012 | Morton | |
| 8,277,530 B2 * | 10/2012 | Alexander | B23P 11/00 55/492 |
| 8,535,404 B2 | 9/2013 | Crabtree et al. | |
| D697,190 S | 1/2014 | Ainley et al. | |
| 8,915,983 B2 | 12/2014 | Brobmann et al. | |
| D725,254 S | 3/2015 | Roblin | |
| D726,892 S | 4/2015 | Chan | |
| D738,998 S | 9/2015 | Laver | |
| 9,242,200 B2 * | 1/2016 | Alexander | B01D 39/1615 |
| D767,748 S | 9/2016 | Nakai et al. | |
| D773,626 S | 12/2016 | Nishiguchi et al. | |
| 9,732,966 B2 | 8/2017 | Lambertson | |
| D800,893 S | 10/2017 | Krob, Jr. et al. | |
| D815,725 S | 4/2018 | Burkhart | |
| D837,965 S | 1/2019 | Lambertson | |
| 10,538,021 B2 | 1/2020 | Morimoto et al. | |
| 10,712,027 B2 | 7/2020 | Gallo | |
| D894,360 S | 8/2020 | Perez | |
| 2003/0164093 A1 * | 9/2003 | Brownell | B01D 50/002 95/268 |
| 2004/0107834 A1 | 6/2004 | Feisthammel et al. | |
| 2004/0107956 A1 * | 6/2004 | Lee | F24C 15/2035 126/299 R |
| 2005/0204714 A1 | 9/2005 | Sundet et al. | |
| 2005/0223686 A1 | 10/2005 | Jeong | |
| 2006/0016339 A1 * | 1/2006 | Mirza | B01D 46/10 96/108 |
| 2006/0157048 A1 * | 7/2006 | Heilman | F24C 15/2035 126/299 R |
| 2007/0245703 A1 * | 10/2007 | Randinelli | B01D 46/0035 55/528 |
| 2007/0293133 A1 | 12/2007 | Marcotte | |
| 2009/0145060 A1 | 6/2009 | Kailani et al. | |
| 2010/0071324 A1 * | 3/2010 | Alexander | D04H 1/04 55/492 |
| 2010/0071326 A1 * | 3/2010 | Alexander | B01D 39/1615 55/514 |
| 2010/0319676 A1 | 12/2010 | Morton et al. | |
| 2012/0192534 A1 | 8/2012 | Lambertson et al. | |
| 2013/0007998 A1 | 1/2013 | Alexander et al. | |
| 2014/0096493 A1 | 4/2014 | Kelmartin et al. | |
| 2014/0130468 A1 | 5/2014 | Jackson | |
| 2014/0250844 A1 | 9/2014 | Lambertson | |
| 2015/0241070 A1 | 8/2015 | Lin | |
| 2015/0265959 A1 | 9/2015 | Crabtree et al. | |
| 2015/0328566 A1 | 11/2015 | Oosthuizen | |
| 2015/0362196 A1 | 12/2015 | Chen et al. | |
| 2016/0131033 A1 | 5/2016 | Herrmann | |
| 2016/0214046 A1 | 7/2016 | Jursich et al. | |
| 2016/0271553 A1 | 9/2016 | Salpietra | |
| 2017/0001135 A1 | 1/2017 | Paramore | |
| 2017/0354910 A1 | 12/2017 | Lambertson | |
| 2018/0207569 A1 * | 7/2018 | Salpietra | B01D 45/06 |
| 2019/0046909 A1 | 2/2019 | Haas et al. | |
| 2020/0147539 A1 | 5/2020 | Michael et al. | |
| 2020/0155989 A1 | 5/2020 | Cueman | |

OTHER PUBLICATIONS

"Kitchen Hood Filters / Baffle Filters / Hood Filters", Available online at: https://www.indiannart.conn/proddetail/kitchen-hood-filters-baffle-filters-hood-filters-3838753191.htnnl, Accessed on internet at: Sep. 8, 2020, 1 page.
U.S. Appl. No. 29/661,668, "Corrected Notice of Allowability", dated Oct. 13, 2020, 3 pages.
U.S. Appl. No. 29/661,668, "Corrected Notice of Allowance", dated Sep. 23, 2020, 5 pages.

(56) References Cited

OTHER PUBLICATIONS

U.S. Appl. No. 29/661,668, "Notice of Allowance", dated Sep. 15, 2020, 9 pages.
"Captrate Combo Filter", Available online at: www.captiveaire.com/CatalogContentUHoods/Accessories/captrate/index.asp, Accessed from Internet on Jan. 20, 2011, 4 pages.
"ExactAire Baffle Filters", Available online at: https://web.archive.org/web/20161023020551/https://www.streivor.com/ventilation/grease-filters/extractaire-baffle-filters, Oct. 23, 2016, 1 page.
"Range Hood Accessories", Available online at: https://web.archive.org/web/20150117033656/http://www.prerniergrease.corn/range-hood-accessories.html, Jan. 17, 2015, 1 page.
U.S. Appl. No. 13/363,128, "Final Office Action", dated Apr. 3, 2014, 10 pages.
U.S. Appl. No. 13/363,128, "Non-Final Office Action", dated Nov. 12, 2014, 11 pages.
U.S. Appl. No. 13/363,128, "Non-Final Office Action", dated May 31, 2013, 5 pages.
U.S. Appl. No. 13/363,128, "Non-Final Office Action", dated Sep. 19, 2013, 9 pages.
U.S. Appl. No. 14/284,350, "Final Office Action", dated Dec. 14, 2016, 10 pages.
U.S. Appl. No. 14/284,350, "Non-Final Office Action", dated Aug. 18, 2016, 10 pages.
U.S. Appl. No. 14/284,350, "Non-Final Office Action", dated Apr. 7, 2016, 18 pages.
U.S. Appl. No. 14/284,350, "Non-Final Office Action", dated Nov. 23, 2015, 6 pages.
U.S. Appl. No. 14/284,350, "Notice of Allowance", dated Apr. 6, 2017, 9 pages.
U.S. Appl. No. 15/640,003, "Non-Final Office Action", dated Feb. 13, 2019, 7 pages.
U.S. Appl. No. 15/640,003, "Non-Final Office Action", dated May 2, 2019, 7 pages.
U.S. Appl. No. 15/640,003, "Notice of Allowance", dated Jun. 19, 2019, 10 pages.
U.S. Appl. No. 29/570,945, "Non-Final Office Action", dated Jul. 10, 2018, 10 pages.
U.S. Appl. No. 29/570,945, "Notice of Allowance", dated Oct. 31, 2018, 9 pages.
PCT/US2015/032018, "International Preliminary Report on Patentability", dated Dec. 1, 2016, 8 pages.
PCT/US2015/032018, "International Search Report and Written Opinion", dated Aug. 17, 2015, 10 pages.

* cited by examiner

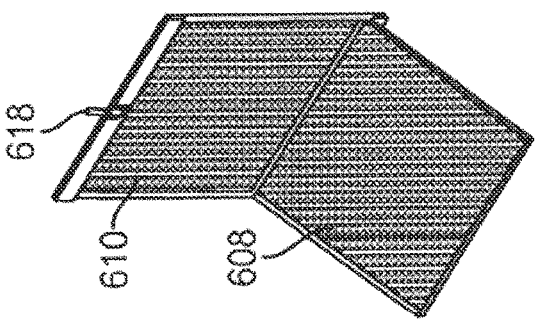
FIG. 6D
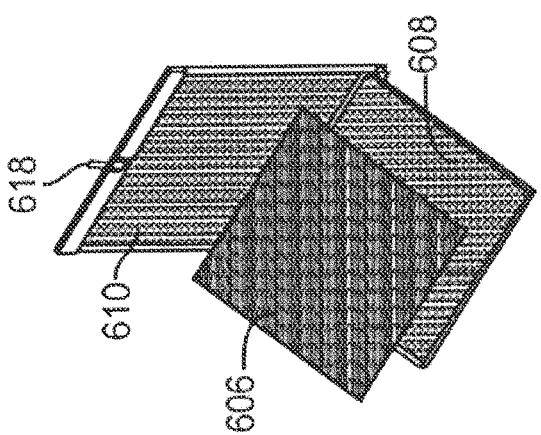
FIG. 6C
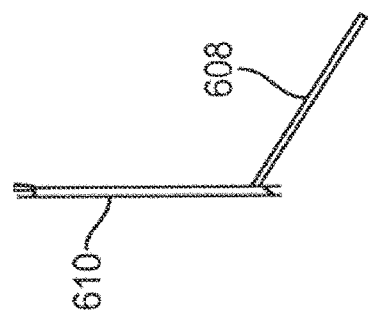
FIG. 6B
FIG. 6A
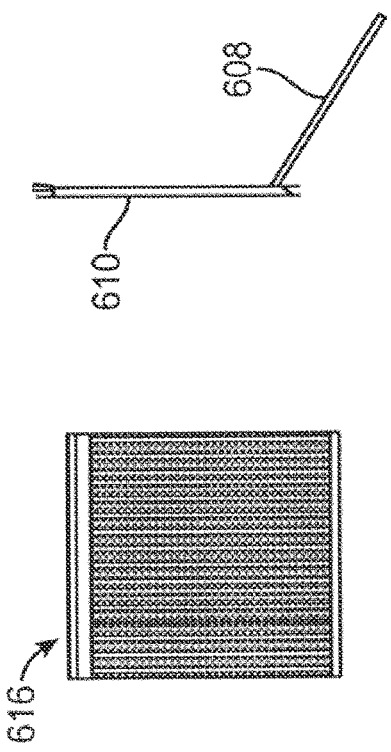
FIG. 6H
FIG. 6G
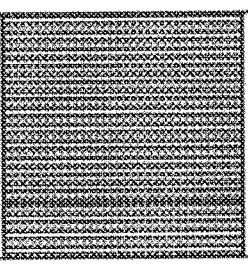
FIG. 6F
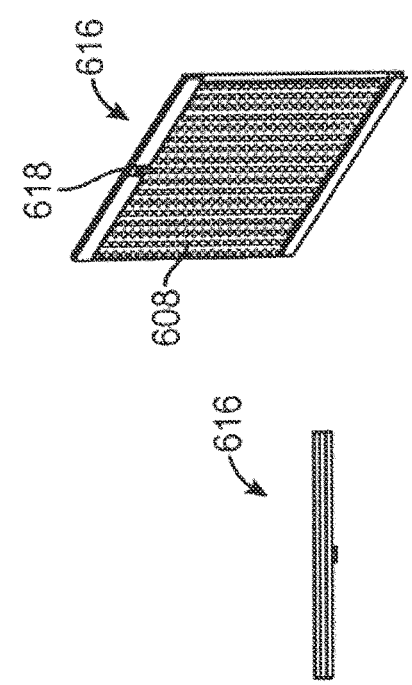
FIG. 6E

MULTI-STAGE HOOD FILTER SYSTEM

CROSS-REFERENCES TO RELATED APPLICATIONS

This application is a continuation of U.S. Non-Provisional application Ser. No. 15/640,003, filed Jun. 30, 2017, now U.S. Pat. No. 10,512,869 issued Dec. 24, 2019 which is a continuation-in-part of U.S. Non-Provisional application Ser. No. 14/284,350, filed May 21, 2014, now U.S. Pat. No. 9,732,966; issued Aug. 15, 2017; which is a continuation-in-part of U.S. Non-Provisional application Ser. No. 13/363,128, filed Jan. 31, 2012 (now abandoned); which claims priority to U.S. Provisional Application Ser. No. 61/438,226, filed Jan. 31, 2011, the disclosures of all of which are hereby incorporated by reference in their entireties.

BACKGROUND

The present invention relates generally to exhaust hoods, and, more particularly, to multi-stage filters for use with such hoods.

In a typical restaurant kitchen, a plurality of cooking units are lined up side by side in a row under a common exhaust hood. The cooking units may include, for example, ranges, griddles, fryers, and broilers. They all produce air laden with grease, smoke, fumes, moisture, and heat in varying amounts and temperatures. The air is drawn in to the exhaust hood, where it is filtered. One known filtration system is disclosed in U.S. Pat. No. 6,394,083 to Lambertson, the disclosure of which is hereby incorporated by reference.

Commercial exhaust hoods manufactured to be installed in the U.S. must comply with certain codes and standards, such as the National Fire Protection Associates (NFPA) Standard 96. This standard requires that all hoods used in commercial cooking establishments that are installed over cooking equipment that creates effluents other than heat and steam, such as grease, during the cooking process include grease removal devices that are individually listed in accordance with Underwriter Laboratories (UL) Standard 1046, or as components of UL 710 listed hoods. This standard requires grease removal devices to be able to prevent the spread of fire from the upstream face of the filter to an area downstream of the filter.

BRIEF SUMMARY

Embodiments disclosed herein provide a filtration system for a ventilation hood, which includes a first, or "primary" filter configured to be mounted within the ventilation hood, including an air inlet, and air outlet, and a grease outlet. The primary filter is configured to drain grease through the grease outlet and out of the ventilation hood. The system also includes at least one second, or "secondary" filter configured to be attached to the primary filter, operatively located downstream of the first filter.

The first filter may be, for example, a cartridge filter, and may be particularly effective as a fire barrier. The second filter may be, for example, woven metal, such as corrugated stainless steel. Alternatively, the second filter may be fiber. The system may further include a perforated sheet configured to be mounted within the ventilation hood downstream of the second filter. The system may also include a filter housing, configured to removably receive the first and second filters. The housing may further house the perforated sheet. The filtration system may further include a third filter configured to be mounted to the first or the second filter, at a location downstream of the second filter.

The first filter may be a cartridge filter or a baffle filter. The filter material of the second filter may be natural fiber or synthetic fiber.

The second filter is disposed either downstream or upstream of the first filter.

The second filter may be attached, such as removably attached, to the first filter.

The housing elements may cooperate to define a housing for the filter material. The housing may be configured to be opened to allow access to the filter material. The upstream housing element may be hingedly attached to the downstream housing element such that the upstream housing element can be hinged open from the downstream housing element to thereby open the housing. A latch may be provided, to hold the housing closed, and may be manipulable by hand to open and close the housing without requiring tools.

Some embodiments of the invention also provide a ventilation hood, housing the above-described system.

A filtration system for a ventilation hood includes a first filter and a second filter, operatively disposed in series. The first filter is configured to be mounted within the ventilation hood, and has an air inlet, an air outlet, and a grease outlet. The second filter includes a filter material with an upstream surface and a downstream surface, an upstream housing element abutting the upstream surface of the filter material, and a downstream housing element abutting the downstream surface of the filter material. The housing elements include openings, and hold the filter material in compression.

The ventilation hood may include a track, and the second filter may be configured to be inserted onto the hood by being moved along the track. The first filter may also be configured to be inserted onto the hood by being moved along the track.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

BRIEF DESCRIPTION OF THE DRAWINGS

Exemplary embodiments will be described in more detail with reference to the accompanying drawings, in which:

FIGS. 4A, 4B, and 4C are isometric views of a filter assembly in the closed, open, and filter material removed states, respectively;

FIG. 4D is an isometric view of the filter assembly of FIGS. 4A-4C as viewed from the other side;

FIGS. 4E and 4F are a top and rear view, respectively, of the filter assembly of FIGS. 4A-4D;

FIGS. 4G, 4H, and 4I schematically illustrate removal of the second filter from the filter assembly of FIGS. 4A-4F;

FIG. 4J is a cross-sectional view of the filter assembly of FIGS. 4A-4I mounted within a hood;

FIG. 4K is a bottom plan view thereof, looking up at the hood from underneath; and FIG. 4L schematically illustrates the filter assembly of FIGS. 4A-4K mounted in a hood above an item of cooking equipment;

FIGS. 5A, 5B, and 5C are isometric views of a filter assembly in the closed, open, and filter material removed states, respectively;

FIG. 5N schematically illustrates the filter assembly of FIGS. 5A-5M mounted in a hood above an item of cooking equipment; and FIGS. 6A-6H illustrate a sixth exemplary embodiment, where:

FIG. 6A is a top view of a filter assembly;

FIGS. 6B, 6C, and 6D are isometric views of the filter assembly of FIG. 6A in the closed, open, and filter material removed states, respectively;

FIG. 6E is a front view of the filter assembly of FIGS. 6A-6D;

FIG. 6F is a cross-sectional view taken along line VIF-VIF in FIG. 6E;

FIG. 6G is a rear view of the filter assembly of FIGS. 6A-6F; and

FIG. 6H is a side view of the filter assembly of FIGS. 6A-6G in the open state.

DETAILED DESCRIPTION OF EXEMPLARY EMBODIMENTS

Exemplary embodiments of the invention provide a filtration system for a ventilation hood including a first, or "primary" filter, which drains grease to a grease drain, and at least one second, or "secondary" filter located downstream of the first filter.

Exemplary embodiments of the invention provide a filtration system for a ventilation hood including a first filter, which drains grease out of the filter, and at least one second filter located either upstream or downstream of the first filter. The first filter is preferably effective at preventing the spread of fire from the upstream face of the filtration system to an area downstream of the system. The second filter includes filter material sandwiched between two perforated sheets of relatively more rigid material.

While fiber filters are prized for their particle filtration abilities, their consistency is similar to that of paper towels, and they are known to collapse during use, particularly with age. For this reason, they are not used as often as might be expected given their excellent filtration properties. The present inventor has discovered that by sandwiching the fiber material between two perforated sheets, the problems caused by the consistency can be rectified. In a presently preferred embodiment, the two sheets are placed very close together to squeeze and hold the material between them. In this way, the material remains in place, regardless of how much grease and other particulates it has absorbed.

The terms "primary," "secondary," and "tertiary," as used herein, refer to the relative placement of the filters within the ventilation hood. The secondary filter is positioned downstream of the primary filter, i.e. between the air outlet of the primary filter and the air outlet of the ventilation hood. Therefore, the air is filtered first by the primary filter, second by the secondary filter, and, in some embodiments, third by the tertiary filter. These terms are used throughout the specification to refer only to the relative positions of the filters within the ventilation hood. The "secondary" filter should not be construed as being subordinate to or less relevant than the "primary" filter, but only as being located in a second position. Likewise, the "tertiary" filter should not be construed as being subordinate to or less relevant than the "primary" or "secondary" filters, but only as being located in a third position.

Figure 1:
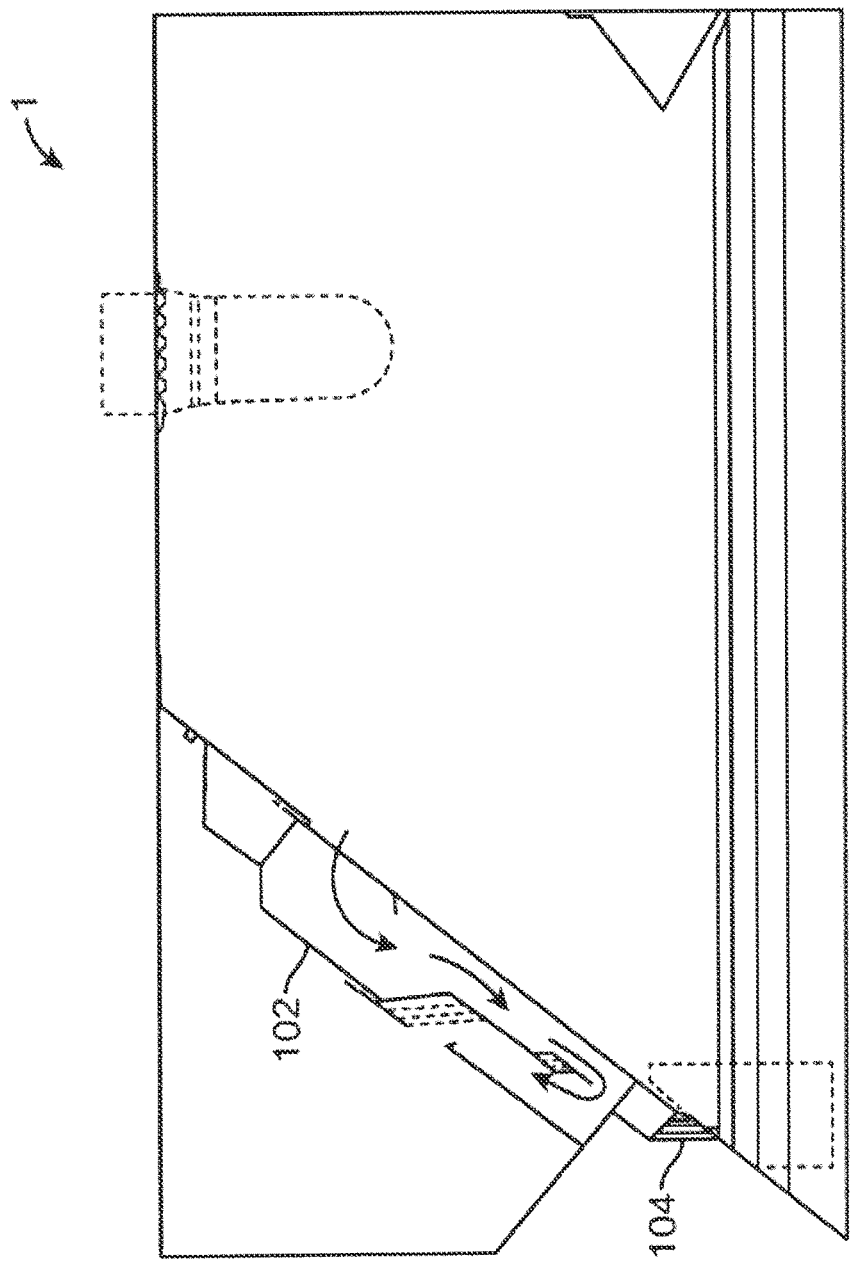
FIG. 1 is a schematic cross-sectional view of a known cartridge filter.

The first filter may be any filter that drains grease out of the filter, and is preferably also an effective fire barrier. One example of a filter for a ventilation hood that drains grease to a grease drain and is an effective fire barrier is the adjustable ventilator cartridge filter disclosed in U.S. Pat. No. 6,394,083 to Lambertson (the inventor of the present application), and shown in FIG. 1. A ventilation hood 1 is disposed above one or more cooking units (not shown). The ventilation hood 1 employs a fan (not shown) to remove the polluted air and exhaust it out of the kitchen, as generally indicated by the curved arrows. A cartridge filter 102 is disposed in the upper rear portion of the ventilator to regulate the air flow through the hood. As seen in FIG. 1, the air enters the cartridge filter 102 from one side and exits the filter on the other side in a controlled manner. It is noted that other arrangements are possible. A grease drain 104 is disposed below the cartridge filter 102. The cartridge filter 102 desirably has a substantially open and unobstructed bottom so that grease does not accumulate inside the cartridge filter 102, but flows to the grease drain 104. In the embodiment illustrated in FIG. 1, the cartridge filter 102 is inclined by about 45°, but other arrangements are possible.

The polluted air enters the filter at the topmost arrow and encounters two immediate direction changes forced by the configuration of the walls of the filter. These immediate direction changes start the segmenting of the heavier pollutants from the lighter air. The air flow then enters a high velocity corridor at the second arrow. The entire flow is sped up and then goes through a drastic turn of direction of about 180° at the third arrow. The high rate of air speed and the sudden change in direction facilitate grease extraction. The separated heavier pollutants are unable to follow the lighter air flow around the sudden change of direction at the third arrow. Thus the momentum of the grease carries it to the bottom of the cartridge filter where it impinges with the hood, and then drains into the grease trough provided in the ventilation hood.

Other grease-draining and fire barrier filters are within the scope of the appended claims.

Another example of a filter for a ventilation hood that drains grease to a grease drain is a baffle-type filter, such as that disclosed in U.S. Pat. No. 3,910,782 to Struble et al, the disclosure of which is hereby incorporated by reference.

The inventor of both U.S. Pat. No. 6,394,083 and the instant application has noted that the cartridge filter of U.S. Pat. No. 6,394,083 and FIG. 1 is very effective at preventing fires from traveling both from the downstream portion of the filter to the upstream portion, and vice versa, as is required by UL Standard 1046.

The grease that is filtered by the cartridge filter is drained rather than being stored inside the filter. In other words, the cartridge filter is an example of a "non-loading" filter, in that the grease does not load up within it. Therefore, if a fire enters the filter, there is very little grease inside of the filter to serve as fuel. The shape of the cartridge filter is also such that a flame cannot travel through the entire filter.

However, the filter of U.S. Pat. No. 6,394,083 and FIG. 1 is satisfactory at filtering out grease with a particle size of greater than about 5 micrometers (μm), but less effective with smaller particles.

Therefore, embodiments of the present invention further include a second disposable or permanent filter, located either upstream or downstream of the first filter, the second filter being permanently or removably attached to the first filter, or mounted within the hood separately from the first filter.

A recent change in the UL 1046 standard now allows for testing of so-called "multi-stage" filters. Materials that cannot and could not pass the fire safety requirement of the standard individually may be utilized if the filter assembly as a whole can pass the test. Less flame-retardant portions of the multi-stage filter must be attached to more flame-retardant portions so a user cannot erroneously install only the less flame-retardant portions.

Embodiments of the present invention thus provide a filtration system with both a primary and a secondary filter, where the primary filter is a very effective fire barrier, and the secondary filter is a very effective grease filter. The resulting combination provides superior performance in both respects. Because the primary filter is very effective as a fire barrier, the secondary filter is protected from potential fire damage. This allows the secondary filter to be made of materials that were previously considered unsuitable for use in a such a filtration system. This also allows the secondary filter to be a "loading" filter, i.e. to store the grease that has been filtered out within the filter. Embodiments of the present invention provide a primary filter that both blocks fire from spreading to the secondary filter, as well as filtering out many of the larger grease particles, which would otherwise load the secondary filter with a large amount of grease, leading to an increased risk of fire spreading, or even clog the secondary filter.

In some embodiments, the secondary filter is made, in whole or in part, of woven metal. The fineness or coarseness of the weave, size of the filter, and material can be selected by a person of ordinary skill in the art based on the teachings herein to advantageously filter any desired particle size. For example and without limitation, the secondary filter may be a stainless steel filter as manufactured by Smith, such as that disclosed in http://www.nationalfilter sales.com/product.php?p=smith-filter_ss10202n&product=100554&category=192 and http://www.ntsupply.com/files/products/stainlessmesh.pdf (both provided as Appendix A of priority application U.S. Ser. No. 13/363,128), the disclosures of which are hereby incorporated by reference. Such an exemplary filter includes seven layers of corrugated stainless steel. Filter elements are processed from stainless steel sheets, expanded to 0.032 strand. Frames are made from stainless steel, no less than 0.024 thickness, joined with stainless steel rivets.

In other embodiments, the secondary filter is made, in whole or in part, of fibers, such as natural, synthetic, and/or hybrid fibers, with or without a stabilizer frame, such as, for example and without limitation, the filter disclosed in U.S. Patent Publication 2010/0071324 to Alexander et al., the disclosure of which is hereby incorporated by reference. In some embodiments, the secondary filter is made, in whole or in part, of wool fiber, such as, for example and without limitation, the filter disclosed in U.S. Pat. No. 6,293,983 to More, the disclosure of which is hereby incorporated by reference.

Figure 2A:
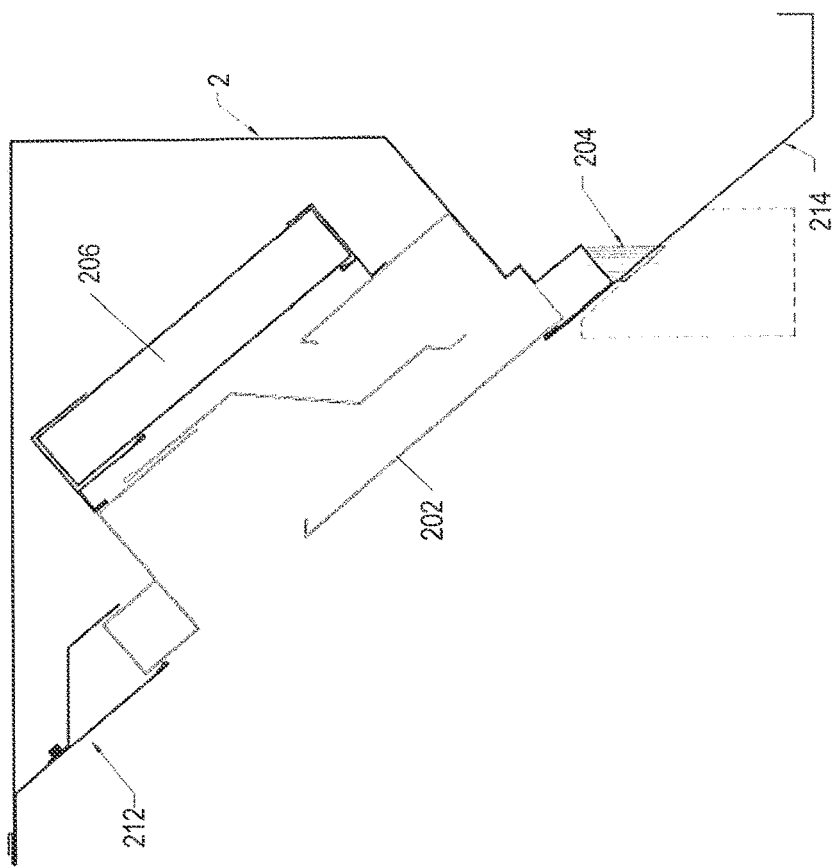
FIG. 2A is a schematic cross-sectional view of a first exemplary embodiment of the filter system.

FIG. 2A shows a first example of the second filter being disposed downstream of the first filter. (This embodiment is similar to that illustrated in FIG. 2 of priority application U.S. Ser. No. 13/363,128.) In this embodiment, the first filter is a cartridge filter 202 with associated pitched grease tray 203 and grease drain 204, and the second filter is a fiber, organic, or other filter 206 located downstream of the first filter 202. The second filter 206 is mounted to the first filter 202 at its downstream end, between the air outlet of the first filter and the air outlet of the ventilation hood 2. The second filter may be permanently or removably attached to the first filter, or merely installed in the hood separately.

Also illustrated in FIG. 2A are two sheets of perforated material 208, 210, such as metal, one immediately upstream of the fiber filter material 206 and one immediately downstream of the filter material 206. These sheets may each have a cross-section substantially identical in shape and size to the filter material 206, to act as a backing for the filter and sandwich it therebetween. They may be approximately 0.5 mm thick and made, for example, of stainless steel. The perforations may take any number or configuration that can be selected by a person of ordinary skill in the art based on the teachings herein, and may take up, for example, approximately 60% of the total cross-sectional area of the sheet. The percent open of each perforated sheet can be selected so as to enable efficient flow resistance behavior for the multi-stage filter system, to allow for enhanced grease capture while not adversely impacting the flow resistance of the multi-stage filter system. Alternatively, the perforated sheets can be made of expanded metal, wire screen or mesh, or any other supporting material—preferably non-flammable—that can be selected by a person of ordinary skill in the art based on the teachings herein.

In further embodiments, the thickness (alternatively referred to as width) of the perforated sheets can be measured according to gauge (ga.). Accordingly, embodiments using 0.5 mm thick stainless steel are approximately equivalent to 25 ga., whereas in other embodiments, 25 ga. galvanized steel is about 0.62 mm thick, and 25 ga. aluminum is about 0.45 mm thick. In other embodiment, the thickness of the perforated sheets can be 18 ga. thick, which for stainless steel is about 1.27 mm thick, for galvanized steel is about 1.31 mm thick, and for aluminum is about 1.02 mm thick. The thickness of the perforated sheets can provide structural strength to the overall filter.

In some embodiments, these perforated sheets provide resistance to the greasy air flowing through the filter material 206, creating an additional static pressure drop across the filter 206. This distributes the air flow more evenly throughout the filter, thus improving the particle extraction efficiency. The width and rigidity of the perforated sheet can very dependent on the amount of resistance the perforated sheet needs to withstand. Perforated sheet widths as thin as 25 gauge can be utilized in low resistance applications and widths as thick as 14 gauge can be utilized in high resistance applications.

In use, polluted air enters the first filter 202, where it is first filtered, and the less-polluted air then enters the second filter 206 with an increased static pressure, and is further filtered there. The clean air then flows through the downstream perforated sheet 210 and exits the ventilation hood 2.

Figure 2B:
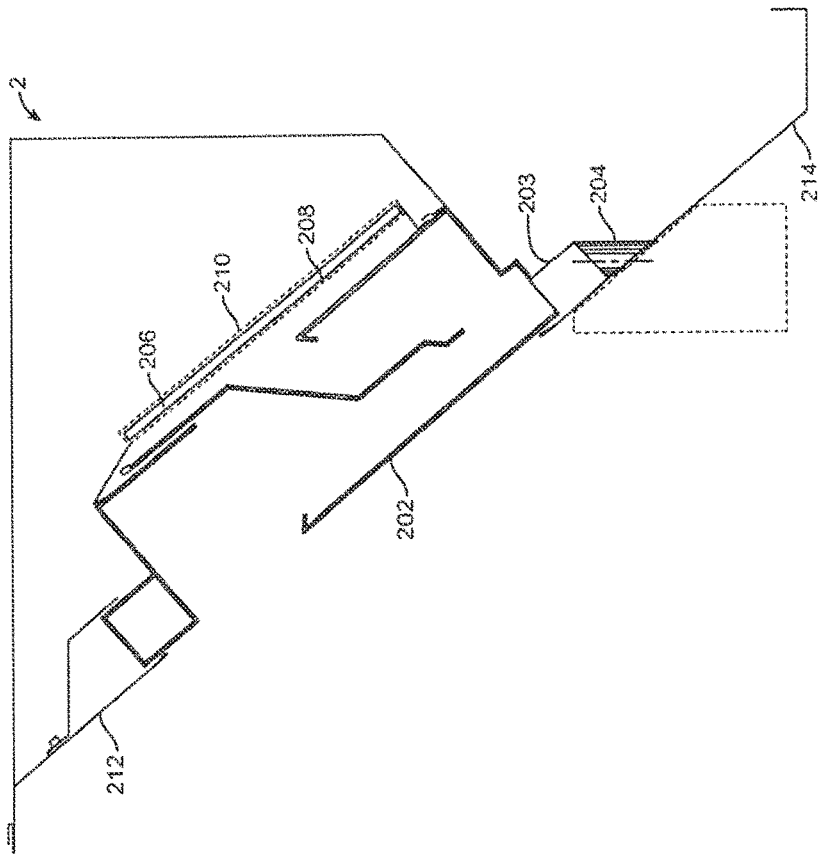
FIG. 2B is a schematic cross-sectional view of a second exemplary embodiment of the filter system.

FIG. 2B shows a second exemplary embodiment, in which the primary filter is a cartridge filter 202 and the secondary filter is a woven metal filter 206. The secondary filter is attached to the primary filter at its downstream end, between the air outlet of the primary filter and the air outlet of the ventilation hood 2. In some embodiments, the secondary filter is attached to the primary filter in a modular form so that both filters can be removed together by a user for cleaning and/or disposal. The filters may be permanently or removably attached to one another. For example, the secondary filter may be disposable while the primary filter is not, or the secondary filter may desirably be disposed of more often than the primary filter. In these instances, the user can disconnect the two filters from one another to reuse one and dispose of the other.

In use, polluted air enters the primary filter, and many of the particles, such as those of a particular particle size, exit the ventilation hood through the grease drain 204, while others remain in the air. The less-polluted air then enters the secondary filter, where further particles become lodged in the secondary filter. The clean air then exits the ventilation hood 2.

Figure 3:
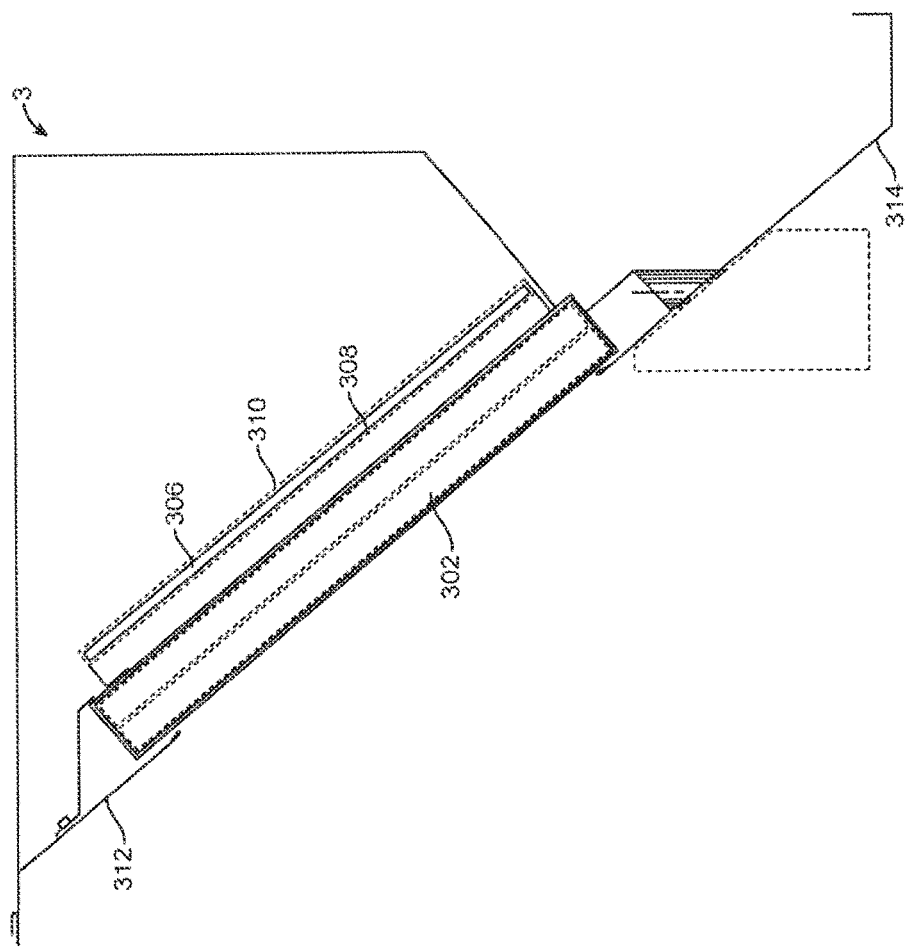
FIG. 3 is a schematic cross-sectional view of a third exemplary embodiment of the filter system.

FIG. 3 shows a second example of the second filter being disposed downstream of the first filter. (This embodiment is similar to that illustrated in FIG. 4 of priority application U.S. Ser. No. 13/363,128.) This differs from the embodiment seen in FIG. 2 of this application in that the first filter is a baffle filter 302 rather than a cartridge filter 202. The second filter 306 is again a fiber, organic, or other filter with associated perforated sheets 308, 310. The second filter 306 is mounted within the ventilation hood 3 downstream of the first filter 302, between the air outlet of the first filter and the air outlet of the ventilation hood. As discussed above, the second filter may be permanently or removably attached to the first filter, or installed in the hood separately.

Other embodiments provide the second filter upstream of the first filter. These embodiments are considered particularly suitable when retrofitting an existing hood. Most hoods, whether with or without first filters, have tracks near the upstream end of the hood. (See 212 and 214 in FIG. 2, and 312 and 314 in FIG. 3.) The present inventor has discovered that these tracks can be used as rails on which to position a filter assembly: either only a second filter (filter material plus perforated sheets) or for hoods that have no filters yet, a second filter integrated with a first filter can be inserted onto the hood and slid on the tracks provided in the hood. The filter assembly can alternatively be attached to the hood by any other appropriate means.

Figure 4E:
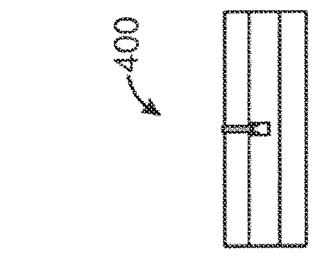
FIGS. 4A-4L illustrate a fourth exemplary embodiment, where.
Figure 4D:
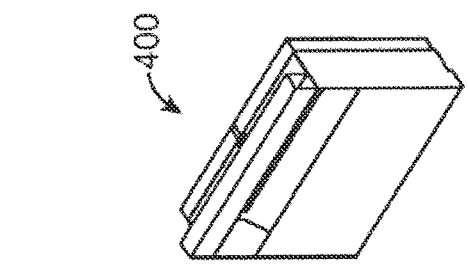
Figure 4C:
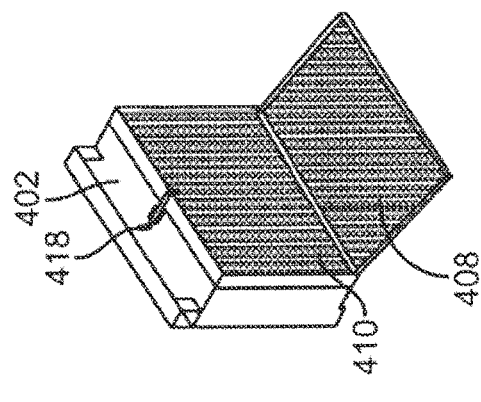
Figure 4B:
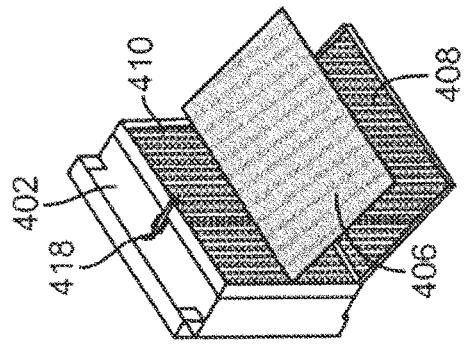
Figure 4A:
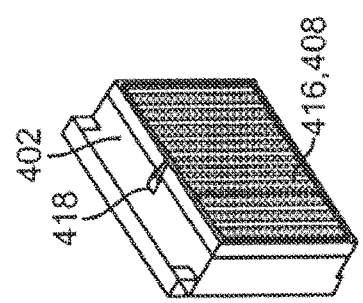
Figure 4J:
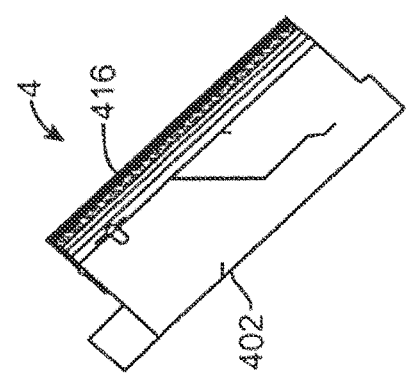
Figure 4I:
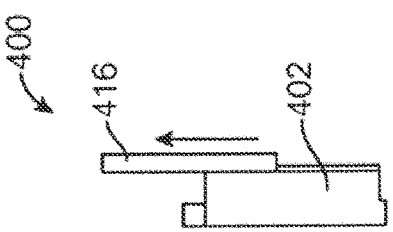
Figure 4H:
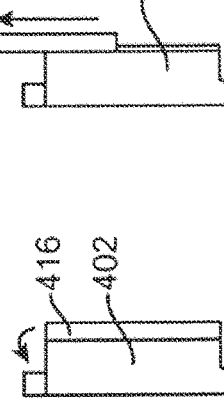
Figure 4G:
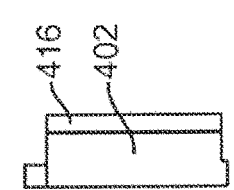
Figure 4F:
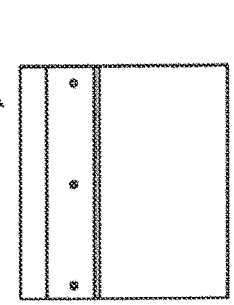

FIG. 4A-4L show a second filter 416 integrated with a cartridge filter 402, to provide a filter assembly 400 that can be slid into an existing hood 4 that does not yet have a filter. As can be seen, the first and second filters are removable from one another by the pivoting motion shown in FIG. 4H or the sliding motion shown in FIG. 4I. The filter material 406 can be removed from between the perforated sheets 408, 410 even when the second filter 416 is attached to the first filter 402, as can be seen in FIG. 4A-4C. A latch or clamp 418 keeps the filter material 406 interior the perforated sheets 408, 410 during use. This latch 418 can be undone by hand, and the upstream perforated sheet 408 can be swung open on hinges to provide access to the fiber material 406 for cleaning or replacement.

Figure 4L:
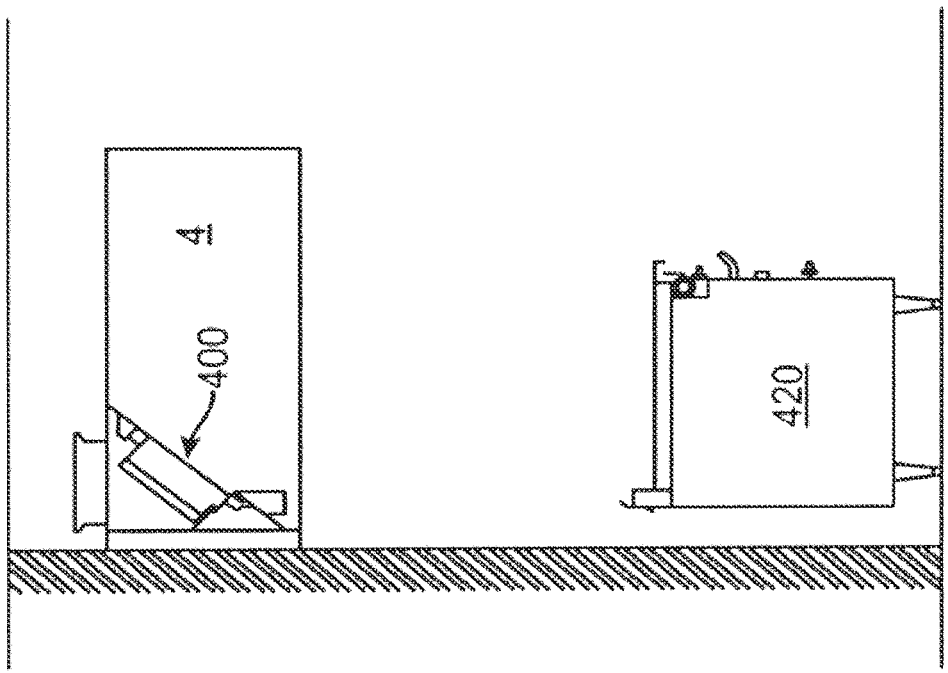
Figure 4K:
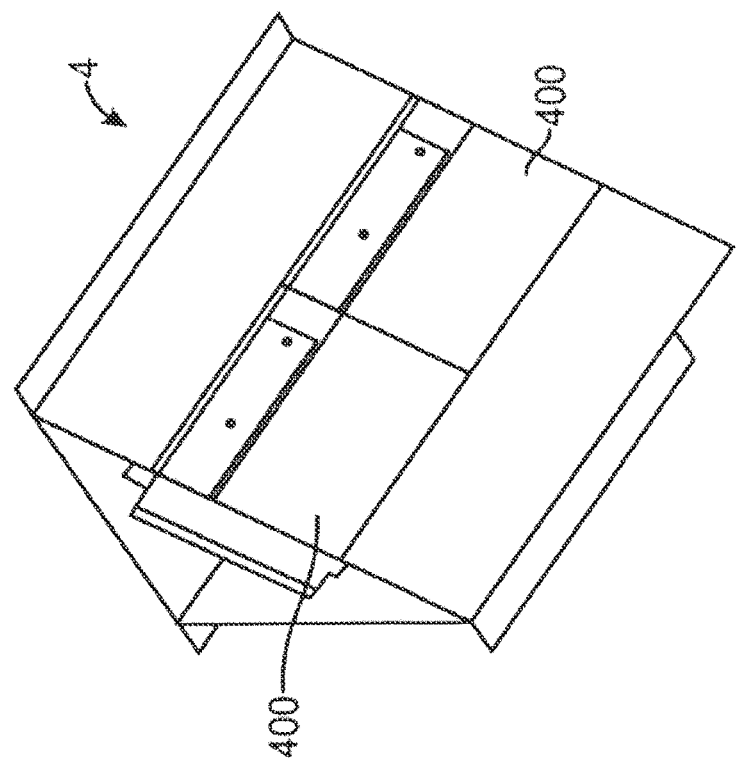

FIG. 4L shows the assembly 400 mounted in a hood 4 over cooking equipment 420. A stove 420 is illustrated for exemplary purposes.

Figure 5A:
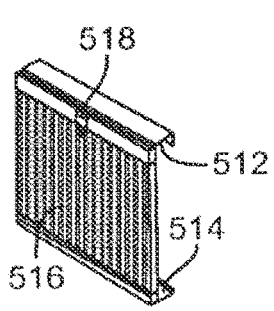
FIGS. 5A-5N illustrate a fifth exemplary embodiment, where.
Figure 5B:
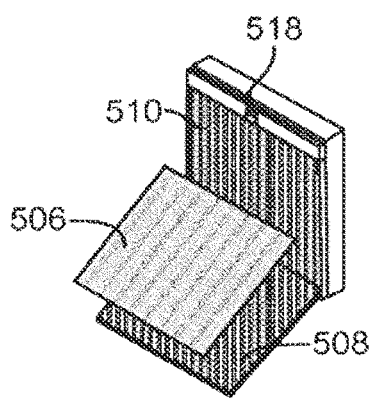
Figure 5C:
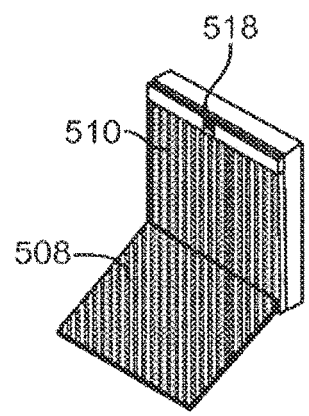
Figure 5D:
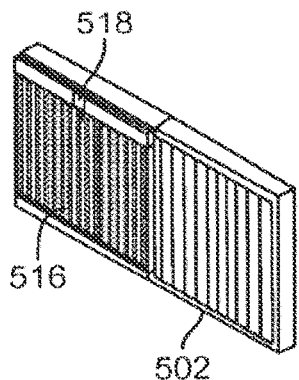
FIG. 5D schematically illustrates removal of the first filter from the filter assembly of FIGS. 5A-5C.
Figure 5E:
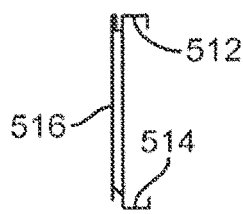
FIGS. 5E and 5F are side views of the second filter of FIGS. 5A-5D, illustrating the closed and open states, respectively.
Figure 5F:
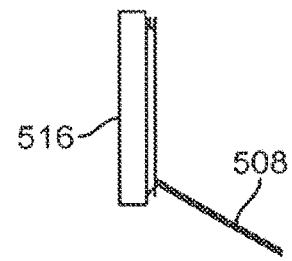
Figure 5G:
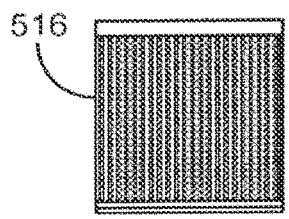
FIGS. 5G, 5H, and 5I are a rear, front, and top view, respectively, of the filter assembly of FIGS. 5A-5F.
Figure 5H:
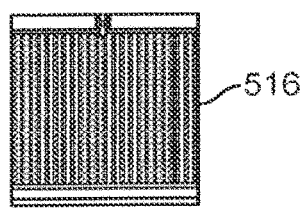
Figure 5I:
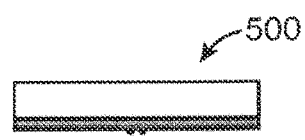
Figure 5J:
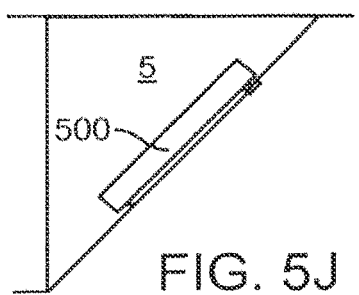
FIGS. 5J and 5K are cross-sectional views of the filter assembly of FIGS. 5A-5I mounted within a hood, with the second filter in the closed and open states, respectively.
Figure 5K:
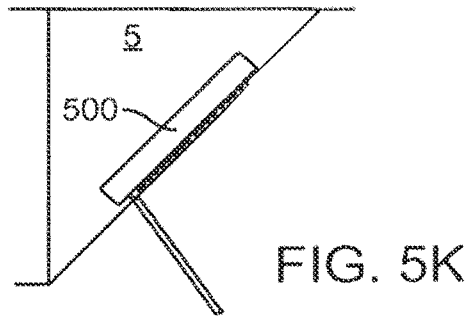
Figure 5N:
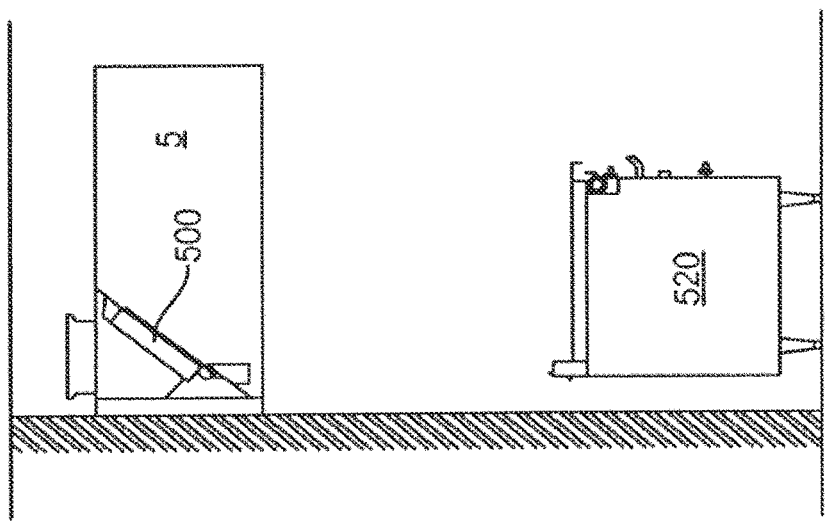
Figure 5M:
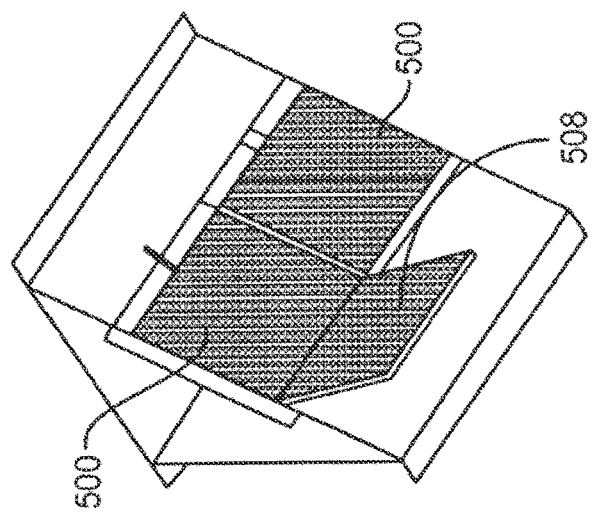
FIGS. 5L and 5M are bottom plan views thereof, looking up at the hood from underneath, with the lefthand second filter in the closed and open states, respectively.
Figure 5L:
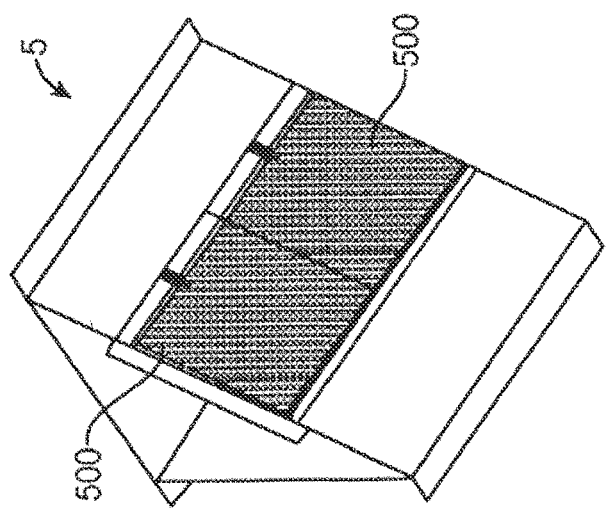

FIG. 5A-5N show a configuration in which the assembly 500 includes a baffle filter 502, rather than a cartridge filter 402, provided as the first filter. In this configuration, the baffle filter 502 can be slid into a track 512, 514 provided on a frame attached to the second filter 516 from the side. The second filter 516 includes filter material 506 sandwiched between perforated sheets 508, 510. A latch 518 keeps the material 506 interior the sheets 508, 510 during use. FIG. 5J-5N show the assembly mounted in a hood 5 that did not previously have a filter. FIG. 5N shows the hood 5 over cooking equipment 520; a stove 520 is illustrated for exemplary purposes.

FIG. 6A-6H show a standalone second filter 616 for attachment into a hood (not shown) that already has a first filter (such as a cartridge or baffle filter). This second filter 616 can be inserted as a standalone add-on item, such as by being inserted into the track of the hood to provide additional filtering capabilities. The filter assembly 616 includes filter material 606 sandwiched between perforated sheets 608, 610. The filter assembly 616 also includes a latch 618 to keep the material 606 interior to the sheets 608, 610 during use.

It should be clear from the foregoing that embodiments described herein provide superior filter systems that are very effective both at removing grease and at preventing fires. It should also be noted that some embodiments create much less static pressure than other devices attempting to achieve similar grease extraction levels. This requires less energy to remove more grease from the airstream.

Figure 7:
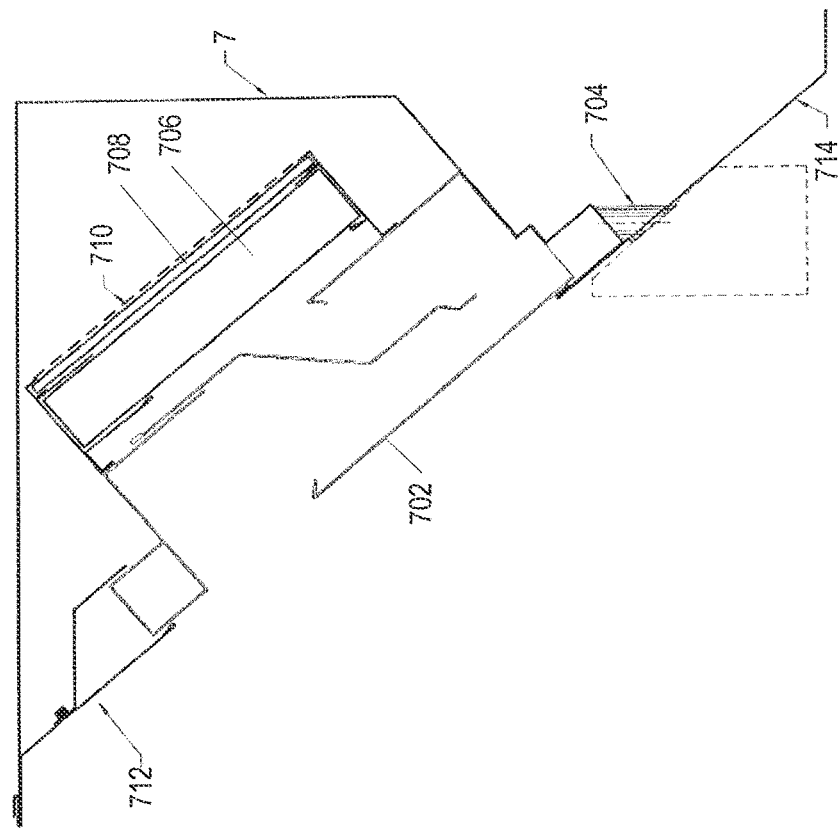
FIG. 7 is a schematic cross-sectional view of a seventh exemplary embodiment of the filter system.

FIG. 7 shows a seventh exemplary embodiment, in which the primary filter 702 is a cartridge filter and the secondary filter 706 is a woven metal filter. This embodiment further includes a tertiary, fiber filter 708 and associated perforated sheet 710. The secondary filter 706 is attached to the primary filter 702 at its downstream end, between the air outlet of the primary filter 702 and the air outlet of the ventilation hood 7. The tertiary filter 708 is also attached to the filter assembly, downstream of the secondary filter 706. As discussed above, the secondary 706 and tertiary filters 708 may be permanently or removably attached to the primary filter 702 in modular form.

In use, polluted air enters the primary filter 702, where it is first filtered. The less-polluted air then enters the secondary filter 706, where it is further filtered. The still less-polluted air then enters the tertiary filter 708, where it is still further filtered. The clean air then flows through the perforated sheet 710 and exits the ventilation hood 7.

While FIG. 7 shows the primary filter as a cartridge filter, the secondary filter as woven metal, and the tertiary filter as a fiber filter, other numbers and arrangements of filters are within the scope of the appended claims.

Figure 8:
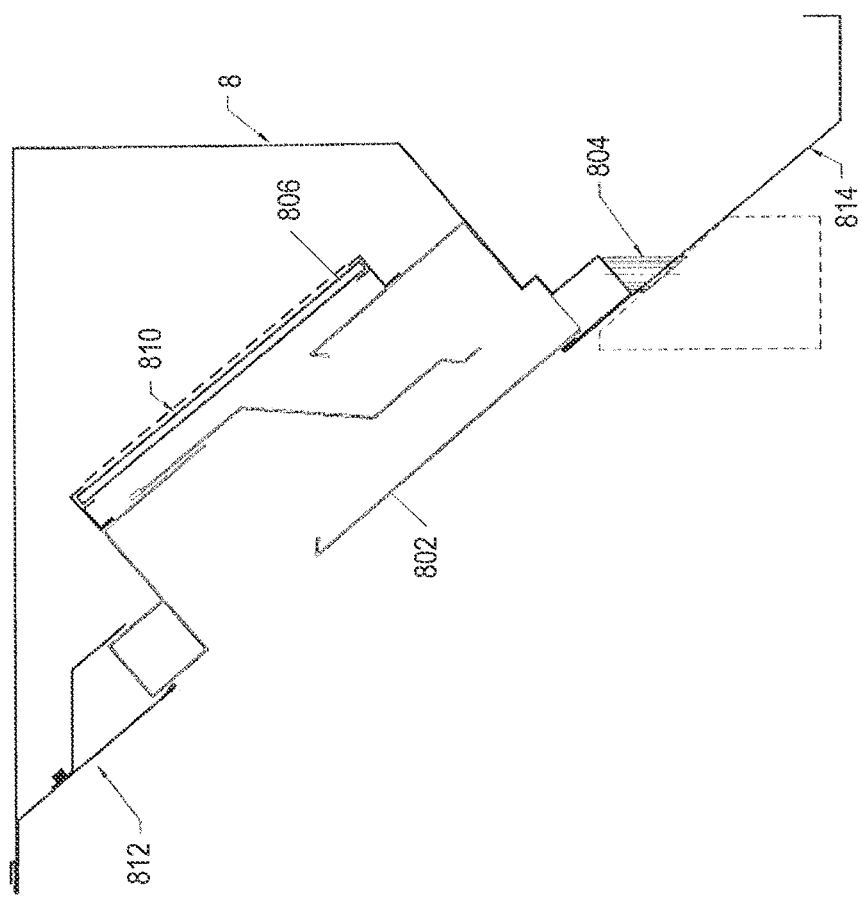
FIG. 8 is a schematic cross-sectional view of a eighth exemplary embodiment of the filter system.

FIG. 8 shows an eighth exemplary embodiment, in which the primary filter 802 is a baffle filter and the secondary filter is a fiber filter 806, with associated perforated sheet 810. The secondary filter 806 is mounted within the ventilation hood 8 downstream of the primary filter 802, between the air outlet of the primary filter 802 and the air outlet of the ventilation hood 8. As discussed above, the secondary filter 806 may be permanently or removably attached to the primary filter.

In use, polluted air enters the primary filter 802, where it is first filtered, and the less-polluted air then enters the secondary filter 806, where it is further filtered. The clean air then flows through the perforated sheet 810 and exits the ventilation hood 8.

Again, most hoods, whether with or without first filters, have tracks near the upstream end of the hood. (See 712 and 714 in FIG. 7, and 812 and 814 in FIG. 8.) Further, most hoods have a grease drain for collecting run-off from primary cartridge filters. (See 707 in FIG. 7, and 804 in FIG. 8.)

Figure 9A:
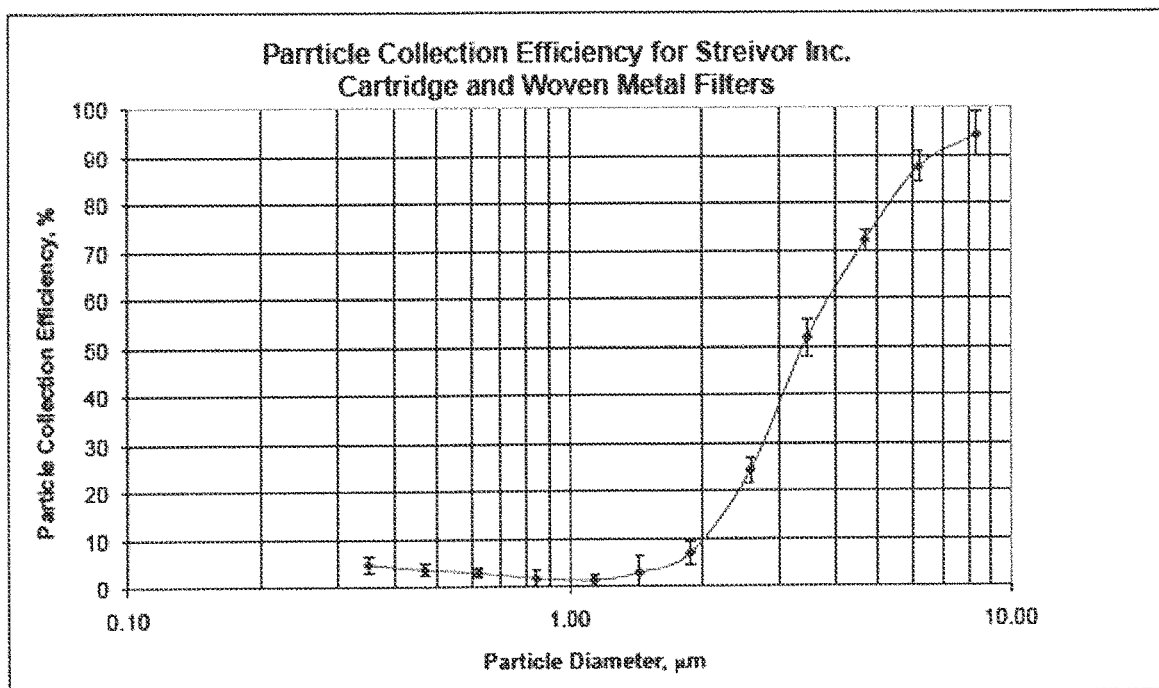
FIGS. 9A, 9B, and 9C are graphs showing particle collection efficiency vs. particle size for the embodiments illustrated in FIGS. 2B, 2A, and 7, respectively.
Figure 9B:
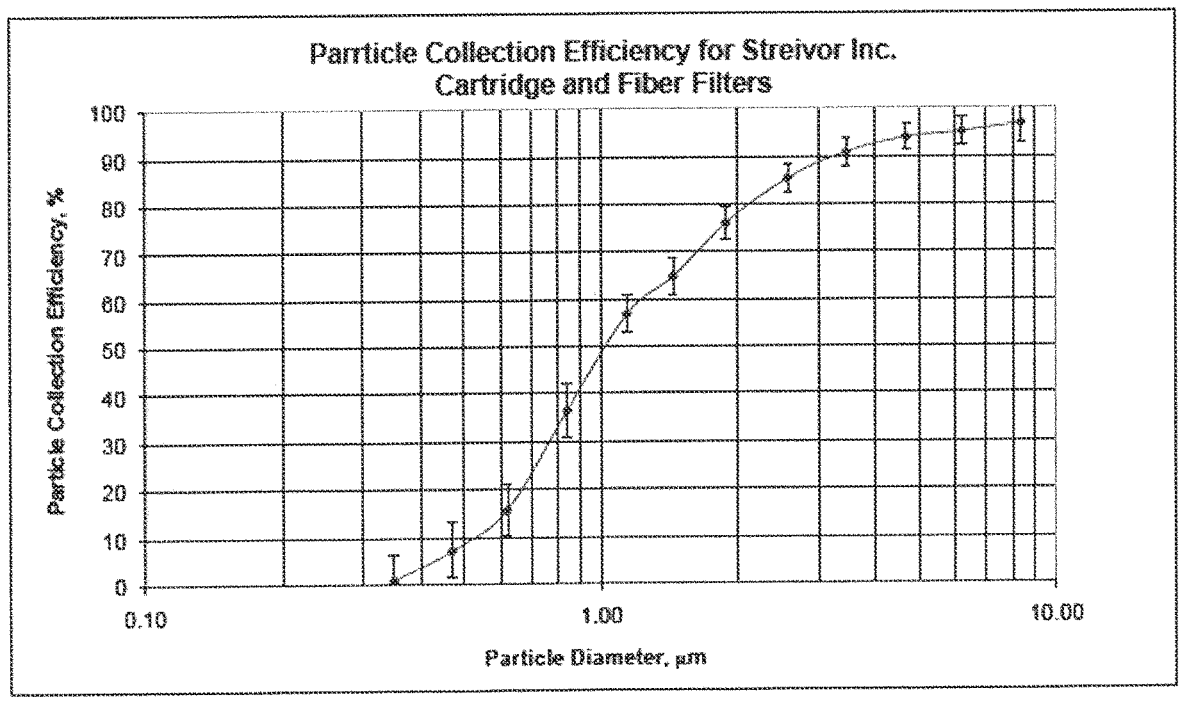
Figure 9C:
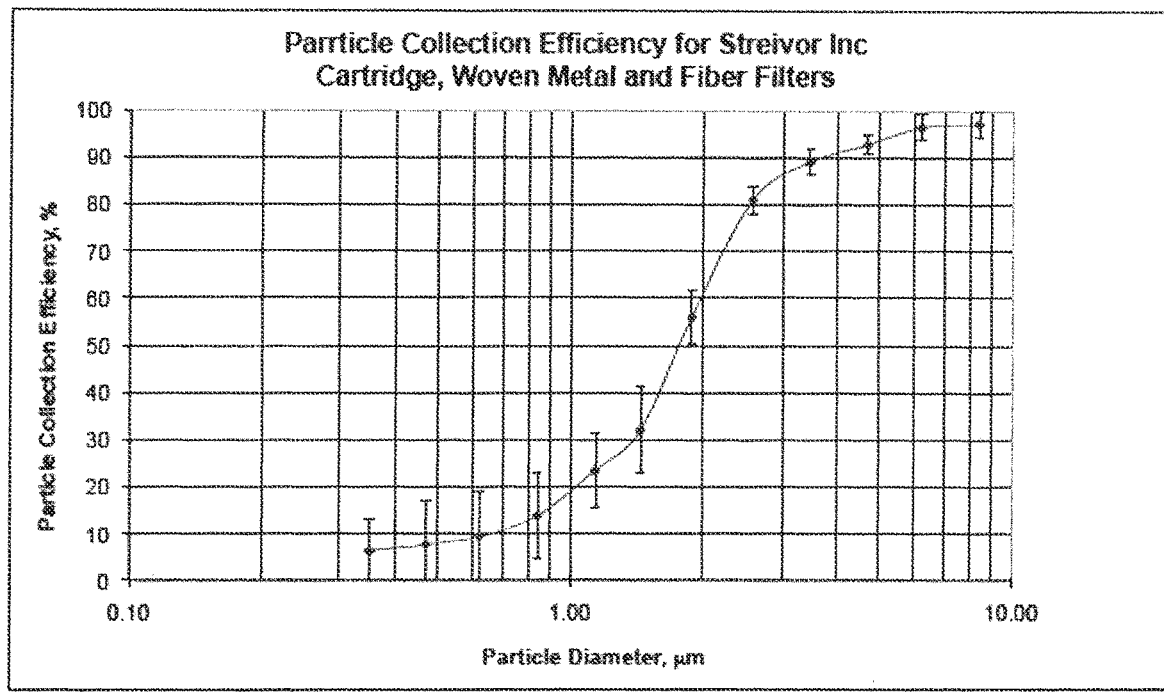
Figure 9D:
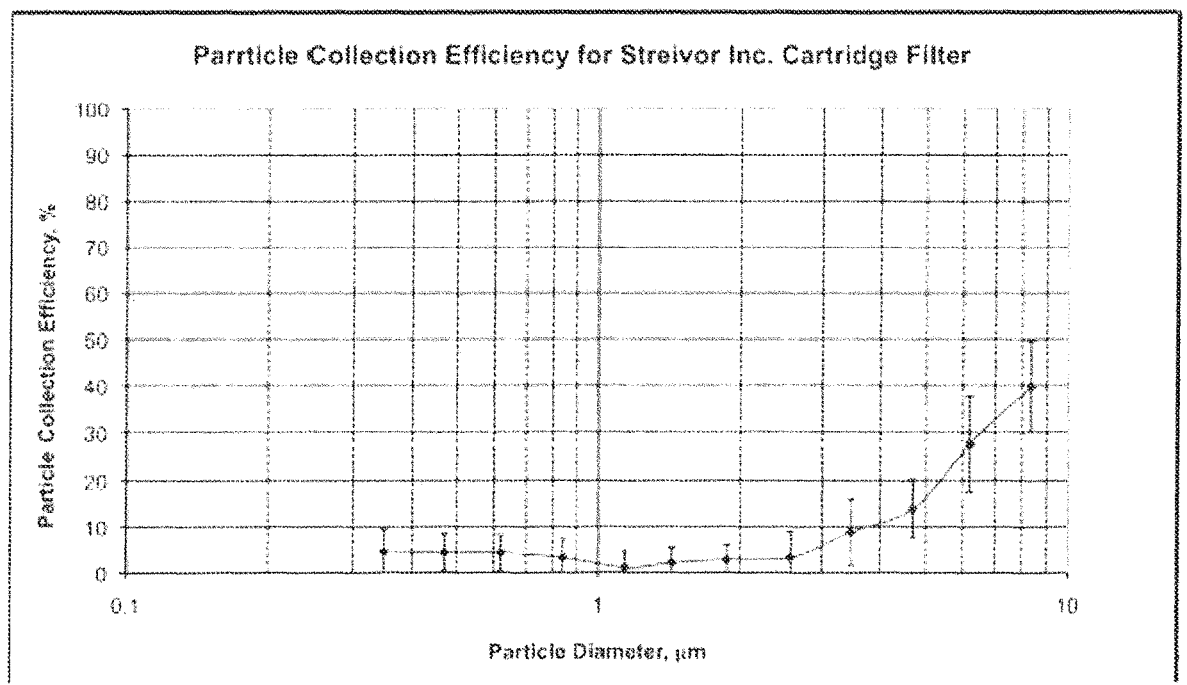
FIG. 9D is a graph showing particle collection efficiency vs. particle size according to the embodiment illustrated in FIG. 1.
Figure 9E:
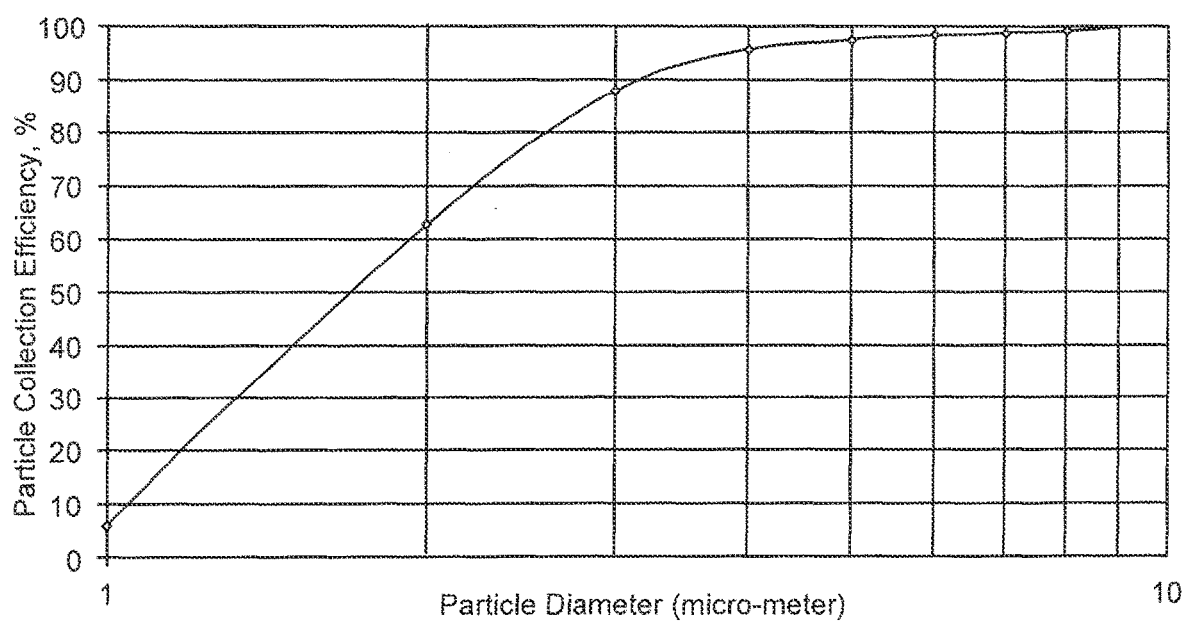
FIG. 9E is a graph showing particle collection efficiency vs. particle size for a known filter setup, not shown in the drawings.

Particle collection efficiency for several exemplary embodiments is illustrated in FIGS. 9A-9C. FIGS. 9A, 9B, and 9C show particle collection efficiency for the embodiments illustrated in FIGS. 2B, 2A, and 7, respectively. FIG. 9D shows particle collection efficiency for the prior art embodiment illustrated in FIG. 1. FIG. 9E shows particle collection efficiency for a known multi-stage filter, which utilizes a baffle filter as the primary filter, and a packed bed of porous ceramic media as the secondary filter.

As can easily be seen by comparing these figures to one another, the embodiment of FIG. 2B reflected in the data of FIG. 9A far surpasses the filter of FIGS. 1 and 9D at particle sizes of 2.5 µm and greater, and is comparable to the filter of FIG. 9E at particle sizes of 5 µm and greater. The embodiment of FIG. 2A reflected in the data of FIG. 9B far surpasses the filter of FIGS. 1 and 9D at all particle sizes, far surpasses the filter of FIG. 9E at particle sizes between 1 and 3 µm, and is comparable the filter of FIG. 9E at particle sizes of 3 µm and greater. The embodiment of FIG. 7 reflected in the data of FIG. 9C far surpasses the filter of FIGS. 1 and 9D at all particle sizes, far surpasses the filter of FIG. 9E at particle sizes between 1 and 2 µm, and is comparable to the filter of FIG. 9E at particle sizes of 2 µm and greater.

Other filter materials are within the scope of the appended claims.

As was mentioned above, the second filter can be placed either upstream or downstream of the first filter. There are three presently preferred configurations: first, the second filter is downstream of the first filter. (This configuration is similar to that discussed in of priority application U.S. Ser. No. 13/363,128 and particularly in the embodiments of FIGS. 2 and 4 therein). Second, the second filter is disposed upstream of the first filter, by being retrofit into an existing hood that already includes a first filter but not a second filter. And third, the second filter is disposed upstream of the first filter, where both filters are retrofit into an existing hood that does not yet include any filters.

The grease removal efficiency and static pressure drop across the filter system are further detailed in, "Particle Capture Efficiency Determination for Streivor Inc. Grease Filters: Final Report," (provided in Appendix B of priority application U.S. Ser. No. 13/363,128) the disclosure of which is hereby incorporated by reference. All references therein (namely, ANSI/ASHRAE Standard 52.2-2007: *Method of Testing General Ventilation Air-Cleaning Devices for Removal Efficiency by Particle Size*, American Society of Heating, Refrigerating and Air-Conditioning Engineers, Inc., Atlanta, Ga. 2007; ASTM Standard F2519-05, *Standard Test Method for Grease Particle Capture Efficiency of Commercial Kitchen Filters and Extractors*, ASTM International; and Kuehn, T. H., Olson, B. A., Ramsey, J. W., Friell, J. and Rocklage, J. M., *Development of a Standard Method of Test for Commercial Kitchen Grease Removal Systems*, Final Report, Department of Mechanical Engineering, University of Minnesota, Minneapolis, Minn., Jul. 31, 2004) are further incorporated by reference herein.

As will be understood by those skilled in the art, the present invention may be embodied in other specific forms without departing from the essential characteristics thereof. Many other embodiments are possible without deviating from the spirit and scope of the invention. These other embodiments are intended to be included within the scope of the present invention, which is set forth in the following claims.

What is claimed is:

1. A filtration system for a ventilation hood, comprising:
   a first filter configured to be mounted within the ventilation hood, comprising an air inlet, an air outlet, and a first filter material; and
   a second filter configured to be mounted within the ventilation hood, operatively disposed downstream in series with the first filter, wherein the second filter comprises:
      a second filter material, wherein the second filter material is less fire resistant than the first filter material;
      an upstream housing element; and
      a downstream housing element;
      wherein the upstream housing element and the downstream housing element cooperate to define a housing for the second filter material, and
   wherein the upstream and downstream housing elements hold the second filter material in compression and allow for a flow through the upstream housing element, then through the filter material, and then through the downstream housing element.

2. The filtration system of claim 1, wherein the first filter is configured for filtering out larger particles in the flow prior to the flow passing through the second filter.

3. The filtration system of claim 1, wherein the second filter is removably attached to the first filter.

4. The filtration system of claim 1, wherein at least one of the upstream housing element and the downstream housing element is formed of a perforated sheet, and wherein the perforated sheet is from 25 gauge to 14 gauge in thickness.

5. The filtration system of claim 4, wherein the perforated sheet is 18 gauge in thickness.

6. The filtration system of claim 1, wherein the housing is configured to be opened to remove the second filter material and insert a new second filter material.

7. The filtration system of claim 6, wherein the upstream housing element is hingedly attached to the downstream housing element and is configured to be hinged open from the downstream housing element to thereby open the housing.

8. The filtration system of claim 6, further comprising a latch configured to hold the housing in a closed configuration, wherein the latch is configured to be manipulated by hand to open and close the housing without requiring tools to replace the second filter material.

9. The filtration system of claim 1, wherein the ventilation hood comprises a track, and wherein the first filter and the second filter are configured to be inserted onto the hood by being moved along the track.

10. The filtration system of claim 1, wherein the first filter and the second filter are mechanically integrated to form a filter assembly, wherein the first filter and the second filter are positioned at a distance separated from each other, the filter assembly being configured to be mounted within the ventilation hood.

11. The filtration system of claim 1, wherein both of the upstream housing element and the downstream housing element are formed of a perforated sheet.

12. The filtration system of claim 1, wherein the second filter material comprises natural fiber or synthetic fiber.

13. The filtration system of claim 1, wherein the second filter is a loading filter.

14. The filtration system of claim 13, wherein the first filter is a non-loading filter.

15. A filter, comprising:
  a filter material comprising a first surface and a second surface;
    a first housing element abutting the first surface of the filter material; and
    a second housing element abutting the second surface of the filter material;
    wherein at least one of the first housing element and the second housing element are formed of a perforated sheet,
    wherein the first and second housing elements hold the filter material in compression, and
    wherein perforations of the perforated sheet cover about 60% surface area of the perforated sheet.

16. The filter of claim 15, wherein the first housing element is hingedly attached to the second housing element and is configured to be hinged open from the second housing element to thereby open the housing and provide access to the filter material.

17. The filter of claim 16, further comprising a latch configured to hold the housing in a closed configuration.

18. The filter of claim 17, wherein the latch is configured to be manipulated by hand to open and close the housing without requiring tools.

19. The filter of claim 15, wherein the first housing element and the second housing element are arranged to create a static pressure drop across the filter.

20. The filter of claim 15, wherein the filter material comprises an organic fiber.

* * * * *